(12) United States Patent
Preston et al.

(10) Patent No.: US 6,868,041 B2
(45) Date of Patent: Mar. 15, 2005

(54) COMPENSATION OF SONAR IMAGE DATA PRIMARILY FOR SEABED CLASSIFICATION

(75) Inventors: Jonathan M. Preston, Victoria (CA); Anthony C. Christney, Victoria (CA)

(73) Assignee: Quester Tangent Corporation, Victoria (CA)

(*) Notice: Subject to any disclaimer, the term of this patent is extended or adjusted under 35 U.S.C. 154(b) by 0 days.

(21) Appl. No.: 10/427,624

(22) Filed: Apr. 30, 2003

(65) Prior Publication Data

US 2003/0206489 A1 Nov. 6, 2003

Related U.S. Application Data

(60) Provisional application No. 60/384,755, filed on May 31, 2002, and provisional application No. 60/377,155, filed on May 1, 2002.

(51) Int. Cl.[7] .............................................. G01S 15/89
(52) U.S. Cl. ........................................................ 367/88
(58) Field of Search ................................ 367/98, 88, 11, 367/7

(56) References Cited

U.S. PATENT DOCUMENTS

| 4,024,490 | A | | 5/1977 | Wood et al. ................... 367/88 |
| 4,611,313 | A | * | 9/1986 | Ziese ............................ 367/88 |
| 5,177,710 | A | | 1/1993 | Gilmour et al. ............... 367/88 |
| 5,493,619 | A | | 2/1996 | Haley et al. ................... 367/88 |
| 5,579,010 | A | | 11/1996 | Iihoshi et al. ................. 342/70 |
| 5,663,930 | A | | 9/1997 | Capell, Sr. et al. ......... 367/119 |
| 6,052,485 | A | | 4/2000 | Nelson et al. ............... 382/225 |
| 6,549,853 | B2 | | 4/2003 | Chakraborty et al. ......... 367/88 |

FOREIGN PATENT DOCUMENTS

WO    WO-03093868 A1 * 11/2003  ........... G01S/15/89

OTHER PUBLICATIONS

Quester Tangent, QTC Sideview (TM), 2004, 2 Pages.*

J.M. Preston, A.C. Christney, S.F. Bloomver and I.L. Beaudet, "Seabed Classification of Multibeam Sonar Images", IEEE Oceans 2001 Conference, Honolulu, Nov. 2001.

J. Augustin, S.Dugelay, X. Lurton & M. Voisser, "Applications of an image segmentation technique to multibeam echo-sounder data", IEEE Oceans '97 Conference, Halifax, Nova Scotia, Canada, Oct. 1997.

D. Caress & D.N. Chayes, "New software for processing sidescan data from sidescan-capable multibeam sonars", IEEE Oceans '95 Conference, San Diego, California, USA, Oct. 1995.

P. Cervenka & C. De Moustier, "Sidescan sonar image processing techniques", IEEE J. Oc. Eng. vol. 18, no. 2, pp. 108–122, 1993.

(List continued on next page.)

*Primary Examiner*—Daniel Pihulic
(74) *Attorney, Agent, or Firm*—Brinks Hofer Gilson & Lione

(57) ABSTRACT

The composition of the seabed can be estimated by measuring the amplitude of echoes back-scattered from the seabed. However, the amplitude measured varies not only with the type of material present on the seabed but also with the range travelled to and the angle of incidence of the transmitted pulse at the seabed. This invention is a method for adjusting the amplitudes of backscattered echoes to compensate for the attenuation due to range and angle of incidence. A compensation table is created, each cell of which is associated with a unique combination of a partition of range and a partition of angle of incidence values. Each cell contains summary data for all echo amplitudes associated with that cell. The echo amplitude values are then adjusted using the summary data held in the compensation table.

40 Claims, 5 Drawing Sheets

OTHER PUBLICATIONS

L. Hellequin, J–M Boucher & X. Lurton, "Processing of high–frequency multibeam echo sounder data for seafloor characterization", IEEE J. Oc. Eng. vol. 28, no. 1, pp. 78–89, 2003.

X. Lurton, J–M. Augustin, S. Dugelay, L. Hellequin & M. Voisset, "Shallow–water seafloor characterization for high–frequency multibeam echosounder: image segmentation using angular backscatter," in High Frequency Shallow Water Acoustics (Pace ed.), Saclantec Conference Proceedings CP–45 (1997).

X. Lurton, S. Dugelay & J–M. Augustin, "Analysis of multibeam echo–sounder signals from the deep seafloor," IEEE Oceans '94 Conference, Brest, France, Sep. 1994.

T.I. Reed & D. Hussong, "Digital image processing techniques for enhancement and classification of SeaMARC II side scan sonar imagery", J. Geophys. Res. vol. 94, pp. 7469–7490, 1989.

G. Shippey, A. Bolinder & R. Finndin, "Shade correction of side–scan sonar imagery by histogram transformation", IEEE Oceans '94 Conference, Brest, France, Sep. 1994.

S. Zietz, J.H. Satriano, & A. Geneva, "Development of a physically based ocean bottom classification analysis system using multibeam sonar backscatter", IEEE Oceans 96 Conference, Fort Lauderdale, Sep. 1996.

Clarke et al., "Areal Seabed Classification using Backscatter Angular Response at 95kHz", High Frequency Acoustics in Shallo Water, NATO Saclantcen, Lerici, Italy, Jul. 1997, pp. 241–250.*

* cited by examiner

COMPENSATION OF SONAR IMAGE DATA PRIMARILY FOR SEABED CLASSIFICATION

CROSS REFERENCE TO RELATED APPLICATIONS

This application claims priority from U.S. provisional application 60/377,155 filed May 1, 2002 and U.S. provisional application 60/384,755 filed May 31, 2002.

FIELD OF THE INVENTION

This invention relates to a technique for estimating the characteristics of the seabed from the amplitudes of echoes received from sound waves transmitted at the seabed. More particularly the invention specifies a method for compensating the amplitudes received from multibeam and sidescan sounders by removing the effects of range and angle of incidence thus providing improved classifications of seabed characteristics such as sediment composition.

BACKGROUND OF THE INVENTION

The estimation of seabed characteristics is made using multibeam and sidescan sounders. Typical of the sounding equipment used is that supplied by the Norwegian company Kongsberg Simrad. For example, the EM 1002 echo sounder records echoes over a 3.3° wide arc (measured fore to aft) and over a 150° sector (measured athwartships) at 95 kHz. For shallow water operations, a pulse of duration 0.2 ms is used and the amplitude of the backscattered echo is sampled at a suitable selected frequency in the range of about 5–15 kHz.

Conventionally, a multibeam sounder is mounted on the hull of a vessel or on a towfish travelling with a forward motion of up to 10 knots. The swath swept out by the sounder has a typical useful size of approximately 5 times the water depth. This wide swath is a considerable advantage as the resulting seabed maps provide greater detail and ensure that there are no uncharted shoals. Further, seabed maps can be produced more quickly, thus reducing ship survey time.

Frequently, multibeam echo sounders are connected to positioning equipment, heading and motion sensing instruments, as well as sound velocity sensors, in order to track the sounder's path and orientation over the seabed. The raw data collected are stored in digital form aboard ship, and receive subsequent processing on shore for "cleaning" (the elimination of unreasonable values) and enhancement.

The amplitude of echoes backscattered from the seabed varies with the type of material present on the seabed as well as factors such as the distance travelled by the pulse to the seabed (the "range") and the angle at which the pulse is incident at the seabed (the "angle of incidence"). By measuring the amplitude of backscattered echoes, it is possible to estimate the composition of the seabed. The angle of incidence at the point from which a given detected sonar signal has been reflected is the angle made at the seabed by the arriving wavefront with a vector normal to the surface of the seabed.

The attenuation of the amplitude signal due to the range of the sound waves through seawater is caused both by the spherical spreading of the wave front as it expands out from its source and by absorption of sound energy in water. The absorption of sound in water depends on the temperature as well as the salinity. A technique, known as time-varying gain ("TVG"), is widely used to compensate for the attenuation caused by different ranges through seawater. This does no more than make a rough adjustment by multiplying the amplitude of the received signal by a factor depending on the range. TVG does not always correct precisely for both spreading loss and absorption of sound by water. Further, TVG does not adjust for the angle of incidence at all. To remove artifacts in the image that remain after applying an estimated TVG, it is popular to apply an adaptive gain based on recently recorded amplitudes. This is inappropriate for sediment classification as it makes the recorded backscatter from a sediment type dependent on adjacent areas and the survey direction.

In "*A real Seabed Classification using Backscatter Angular Response at 95 kHz*" [J. E. Hughes Clarke, B. W. Danforth and P. Valentine published in "*High Frequency Acoustics in Shallow Water*", NATO SACLANTCEN, Lerici, Italy, July 1997], the authors describe a proposal for seabed classification based on the shape of the angular response curve ("AR"). The AR curve plots the amplitude of the backscatter signal against the angle of depression towards the seabed. The shape of the AR curve is considered in three domains, the length and slope of which are suggested as being determinative of the nature of the seabed. This research offers some insight into the classification problem but does not offer a means or methodology for determining the sediment type, nor any proposal for generating processed data that would adequately represent seabed classification by sediment type or otherwise.

In "*Seabed Classification of Multibeam Sonar Images*" [J. M. Preston, A. C. Christney, S. F. Bloomer and I. L. Beaudet published in the proceedings of the IEEE Ocean's 2001 Conference, Honolulu, November 2001] the authors, who include the inventors named in this present patent application, outline the context in which the present invention is described. They point out that a division of the seabed echo data and corresponding seabed sediment data into acoustic classes is useful because substrate characteristics for any given sediment class are relatively constant throughout such class and are distinct from those of other classes. This makes it possible to considerably reduce the amount of real sampling of the seabed that needs to be done in order to convert the acoustic classification into a classification by sediment type. The technique proposed by the authors relies on computing measures ("features") that are used, alone or in combination, to infer an appropriate acoustic classification from the recorded data by conventional statistical techniques. Further detail of the techniques employed is provided below. As the processing performed makes use of the entire survey data set, the classification is conveniently done after the survey is complete. In general, this technique can be applied to backscatter data from any multibeam system, provided it is operated consistently during the survey.

Preston et al. in the foregoing paper suggest the computation of more than 130 features that can be used in a principal components analysis to determine the most effective combination of features to act as the predictor of sediment type. Examples suggested are mean, standard deviation, higher-order moments, histogram, quantile, power spectra and fractal dimension. As a final step, cluster analysis is suggested to optimally assign classifications to collected data.

In "*HIPS: Hydrographic Information Processing System*" [M. Gourley and D. Dodd, White Paper #21, CARIS, Fredericton, New Brunswick, 1998] the authors describe a Hydrographic Data Cleaning System ("HDCS") that provides a set of interactive software tools for detecting and cleaning up raw swath data. A number of these tools rely on having a human being available to identify and correct (or remove) bad data through personal inspection of the data.

Among the published United States patent literature, there are two patents that have some relevance to the normalization technique of the invention. U.S. Pat. No. 5,493,619 describes a normalization technique for eliminating false detections in a mine detection process. U.S. Pat. No. 6,052,485 describes a method for automatically identifying clutter in a sonar image. Neither of these issued patents attempts to deal with the enhancement of sonar data for seabed classification.

There are a number of United States patents which disclose inventions of apparatus or methods related to multibeam sounders. U.S. Pat. Nos. 4,024,490, 5,177,710, 5,579,010 and 5,663,930 are representative and provide further details of the equipment and methods used in echo sounding.

In U.S. Pat. No. 6,549,853 Chakraborty et al. describe a technique for measuring seafloor roughness using a multibeam sounder. The method described there relies on fitting survey data to predictions from theoretical backscatter models combined with geometrical corrections and detailed knowledge of particular sonar systems. However, such a technique does not have the advantages of statistical approaches, which are intuitive and give useful results with a wide range of sonar systems that do not have to be calibrated.

The data used to estimate the character of the seabed are echoes recorded from sound pulses transmitted towards the seabed. Each echo measured is a time series of the amplitude of sound received from a point on the seabed by a detector and is a sequence of digital values sampled from the analog signal at equal time intervals. Each time series has a "dead" period corresponding to the round-trip of the pulse to the nearest survey point on the seabed, followed by a spike corresponding to the backscattered echo of the pulse from the seabed. The essence of the classification procedure is to compare features (statistical measures, particularly defined below) derived from the amplitudes measured at survey points within rectangular patches on the seabed and where the features are judged to be sufficiently "similar", assign those patches to the same acoustic classification. Subsequently, the acoustic classifications are related to real attributes of the seabed by actual observation of the seabed at representative points.

However, the echo amplitudes are affected by a number of factors, each of which must be compensated for if a useful comparison is to be made between echoes received from different survey points:

(1) The best multibeam transmitters produce a wave approximately resembling a fan—having a broad arc shape transverse to the motion of the vessel (typically 150 degrees) and a narrow uniform angle along the vessel's path (typically 1–3 degrees). The pulse advances on the surface of a sphere and its intensity falls off according to an inverse square law.

(2) The transmitter does not produce a beam of uniform intensity across all angles. Typical transmitter elements: produce pulses varying considerably in amplitude according to the angle of depression.

(3) Seawater absorbs energy non-uniformly, typically dependent on both temperature and frequency. This causes a reduction in the amplitude of echoes detected.

(4) Because the backscatter is from a wide swath, and because the bottom is often irregular, the echo received varies substantially with the angle of incidence at the seabed.

In practice, items 2 and 3 above are dealt with by the manufacturers of multibeam sonar systems. In particular, such manufacturers are able, to some extent, to incorporate adjustments internally to compensate the echo signal for the non-uniformity of angular transmission and to generate frequencies in a narrow range.

Thus there remain two important factors, range (item 1) and angle of incidence (item 4), which require compensation before valid comparisons can be made between echoes received from different points on the seabed.

SUMMARY OF THE INVENTION

This invention relates to the enhancement of sonar image data, especially seabed echo data. In the context of a seabed survey, the present invention adjusts the amplitude of echoes detected from the backscattering of sonar pulses at survey points on the seabed for the attenuating effects of range and angle of incidence. The resulting compensated echo amplitudes are used to display enhanced images and to classify seabed sediments.

In the preferred embodiment of the invention a compensation table is used. The compensation table has two dimensions: one corresponding to range and the other to angle of incidence. The cells correspond to partitions of range and angle of incidence data, selected so that every pair of range and angle of incidence occurring in the survey dataset as a whole, can be found in a single cell of the compensation table. Each cell contains summary data for the count, sum and sum of squares of associated echo amplitudes. The amplitude of each echo recorded in the survey is adjusted as a function of the summary data stored in the relevant compensation table cell. The population of resulting echo amplitudes associated with each cell has zero mean and unit variance.

In a first aspect of the invention, echo amplitudes are adjusted to compensate for the attenuating effects of range and angle of incidence and are displayed in a variety of styles and in a variety of media.

In a second aspect of the invention, the echo amplitudes, adjusted to compensate for the attenuating effects of range and angle of incidence, are processed further to produce classifications of the seabed according to the acoustic nature estimated at a number of patches which substantially cover the survey area. These results, alone or in combination with other data, are suitable for display in a variety of styles and in a variety of media.

Although the present invention is particularly useful for and is described principally in the context of sediment classification, the compensation technique according to the invention has wider application. For example, the invention can also enhance images of the seabed for the improved identification of shipwrecks or aircraft debris. In principle, the invention can be used to enhance the processing of echo amplitudes from any exposed stratum or object capable of providing an echo amplitude from the reflection or backscattering of a transmitted sonar pulse.

The invention is adaptable for use with multibeam or sidescan echo sounders available commercially from a number of suppliers. The detailed operation of the apparatus required to practice the inventive methodology varies from supplier to supplier. The preferred embodiment describes the use of the invention with a multibeam echo sounder. An alternative embodiment describes the invention in use with a sidescan echo sounder.

Other features and advantages of the invention will become apparent from the detailed description and the claims that follow.

DETAILED DESCRIPTION

Figure 1:
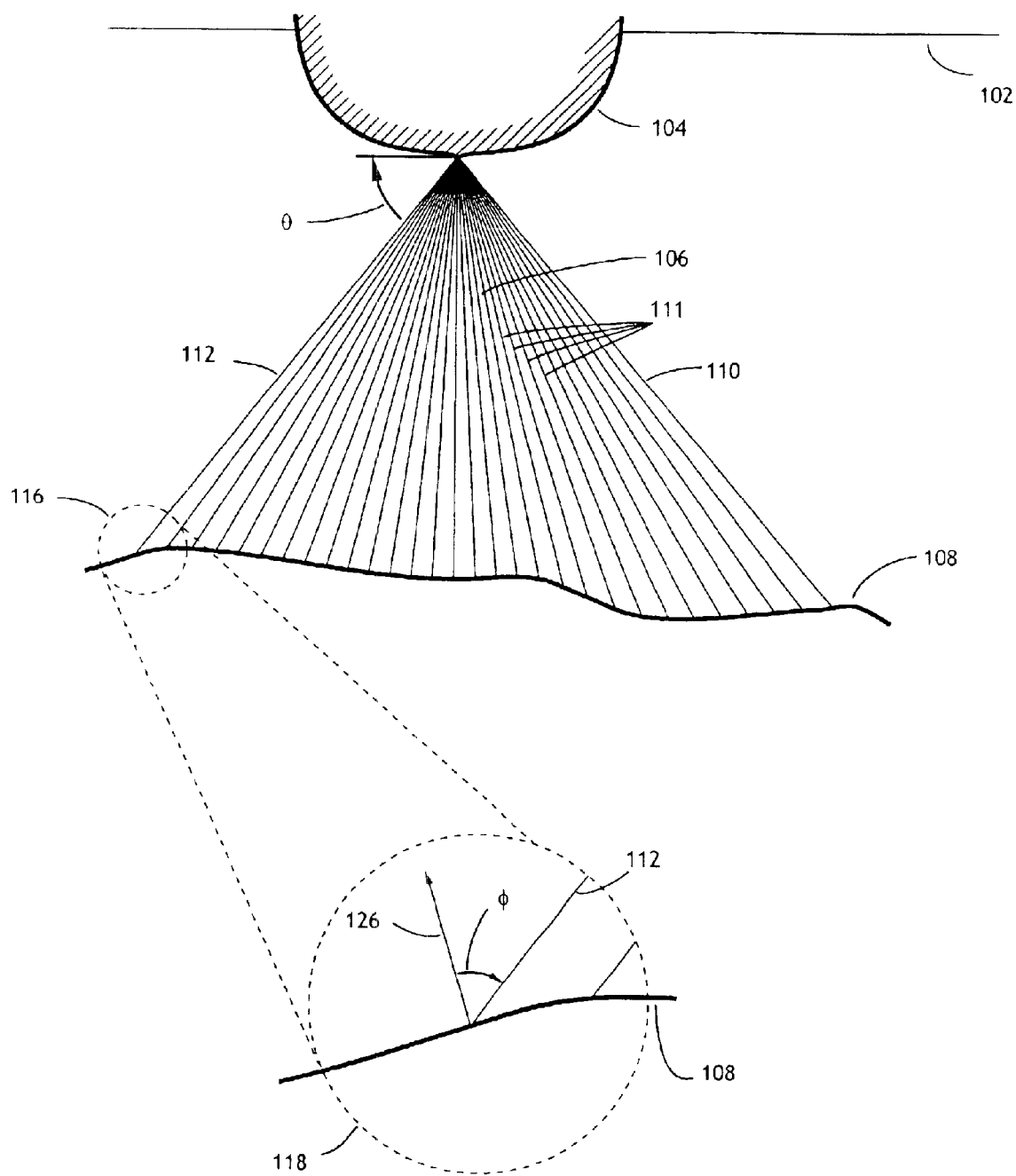
FIG. 1 is a schematic drawing of a vessel projecting a sonar pulse onto a representative portion of the seabed. The figure includes an enlarged area showing the angle of incidence of a selected portion of the fan. The methodology illustrated for the sonar projection and detection is previously known.

FIG. 1 shows schematically a cross-section athwartships of a vessel 104, travelling in a direction into the plane of FIG. 1 and emitting a repeated series of pings from a transmitter (not shown) located in the vicinity of the keel of the vessel 104. Each ping is made up of a short pulse of sound waves that propagate approximately spherically out towards the seabed 108. The surrounding water level is shown as 102.

The transmitter transmits a ping lasting typically between 0.2 and 15 ms. To avoid interference between successive pings, it is not possible to transmit a second ping until the echo from a first ping has returned to the vessel 104. In water of a depth requiring a sound wave to traverse a range of 250 metres, the round-trip time is approximately one third of a second. Typically, soundings are made twice per second.

A detector (not shown), including complementary sampling and data-processing equipment, is located in the vicinity of the transmitter. The analog signals of sound energy scattered back from the seabed 108 are sampled at 300 Hz to 25 kHz to produce digital echo amplitudes. The detector is designed only to receive energy arriving from a solid angle having a fan shape indicated generally in the plane transverse to the motion of the vessel as 106. The fan 106 extends across an arc (typically greater than 150°) transverse to the motion of the vessel and is oriented downwards towards the seabed 108. The fan 106 has a uniform angular size in the direction of the motion of the vessel 104, typically 1–3°.

In a multibeam echo sounder, the detector measures the amplitude of the sound energy received at a number of uniformly spaced solid angles within the fan 106, each of which is referred to as a beam. Usually there are more than one hundred beams, shown generally as 111 within the fan 106. Beams 110 and 112 are representative. Each beam 111 corresponds to a known depression angle relative to the horizontal θ. Typically, multibeam echo sounders provide digitized values for the amplitude of the echo as time series, one time series for each beam. The values at individual points within each time series correspond to the amplitudes of echoes received as the ping's wavefront passes across the beam's footprint on the seabed. For the purposes of image enhancement and sediment classification according to the invention, the time series separately recorded for each beam are combined together into a single set of observations for each ping.

In a sidescan echo sounder, the detector (usually a pair, one for port and one for starboard) records the digitized values of echo amplitudes scattered back from the seabed at known ranges for each ping but without any record of the corresponding angles of depression. In the absence of measured angles of depression, values for the angle of depression are calculated assuming that the seabed is flat. The angle of depression for a particular echo amplitude is calculated as the inverse cosine of the range to the nadir divided by the range to the survey point in question.

The resulting data captured for a single ping from either a multibeam or sidescan sounder are (usually several thousand) digital echo amplitudes each having an associated, known range and angle of depression.

A portion 116 of the upper view of FIG. 1 is shown as an enlarged detail view 118 in the lower part of the drawing to illustrate the definition of the angle of incidence $\phi$. The seabed 108 is generally not flat and its topography is described by a set of normal vectors each orthogonal to a small element at a survey point on the seabed 108. The angle of incidence $\phi$ at any survey point on the seabed 108 is the angle in three dimensions between a line from the transmitter to that survey point 112 and the normal vector 126 at that survey point.

Other shipboard instrumentation, all conventional, provide data for several variables pertaining not only to the ping and its echo but also to the motion of the vessel or the towfish. These variables include the course, velocity, roll, pitch and heave of the vessel. This information is used to relate the survey data to a geographic position on the surface of the Earth and to adjust all angles measured relative to the axes of the vessel for the vessel's movement along its course, with due correction for wind, current and wave buffeting, relative to the Earth's surface.

Figure 2:
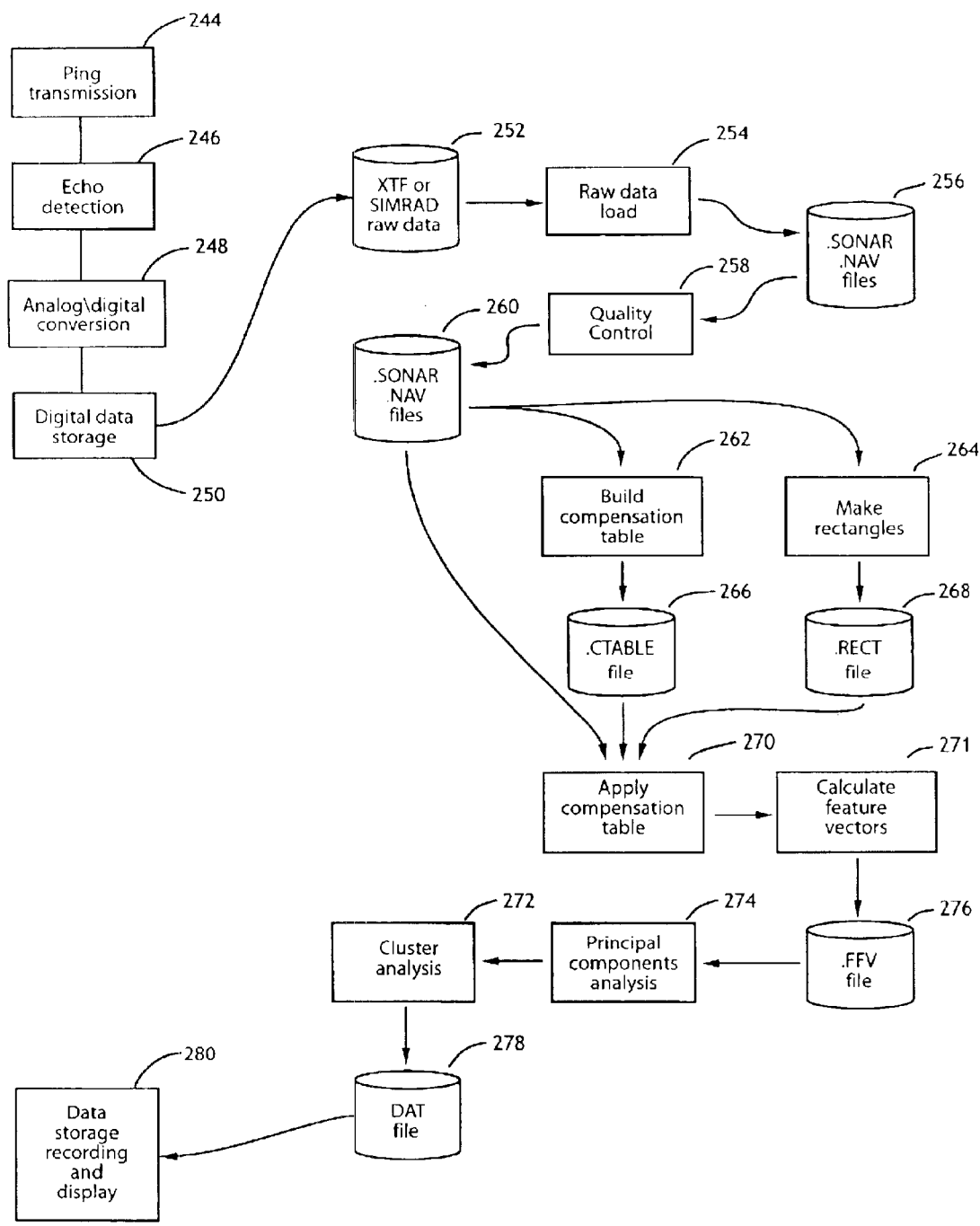
FIG. 2 is a schematic flowchart of the typical steps in the processing of raw sonar data according to the invention to produce output digital data representing sediment classification.

FIG. 2 shows a flowchart of the typical processing steps taken in the preparation of sediment classification data according to the preferred embodiment of the invention from the raw data 252 supplied by a multibeam or sidescan echo sounder. At suitable points in the processing, data are stored in files of a particular format. The names of these formats (.SONAR, .NAV, .RECT, .CTABLE, .FFV and .DAT) refer to particular formats used within the QTC Multiview product supplied by Quester Tangent Corporation of Sidney, British Columbia. The particular details of these formats are not of significance in the description of the invention.

The method to be described in steps (1) to (12) below includes the methodology of the invention in the context of other typical and well-known data processing steps. Steps (1) to (3), (4)(a), (4)(b), and (6) to (12) are well-known methods relying on standard techniques. Steps (4)(c) and (5) are novel and descriptive of the preferred embodiment of the present invention.

(1) With reference to FIG. 2, the steps involving ping transmission 244, echo detection 246, digital sampling 248 and the storage of the resulting digital data 250 have been described above with reference to FIG. 1.

Raw data 252 initially obtained in digital form from a detector are stored on a suitable storage medium, such as a hard disk, and are converted (step 254) from one of a variety of formats established by the manufacturers of echo sounder hardware to a standard format. The steps in the process of FIG. 2 beginning with step 254 are typically performed ashore on the raw data 252 after the survey is complete. In the preferred embodiment, the raw survey data 252 are converted to a .SONAR file format and the additional data supplied about the vessel's position and instantaneous orientation are converted into a .NAV file format. The results are stored (step 256) typically as files on a hard disk.

The .SONAR data includes the travel time from the transmitter to the seabed for each detected survey point, and the corresponding fore-aft and athwartship angles of depression. These allow the depth to be calculated at each survey point. The .NAV file contains ship position and orientation data which can be combined with data from the .SONAR file to give the geographic position of each survey point.

The data resulting from one ping contains values of range, depression angle and echo amplitude at each of the survey points within the fan measured transverse to the course of the vessel. Typically, this amounts to data at each of several thousand points. These data are stored on a hard disk.

(2) Invariably some of the echoes detected are of no utility. They may be misleading reflections from an intervening object, or spurious values caused by the measuring equipment.

In the Quality Control step 258, the range to each survey point is computed and values that do not appear to be reliable are marked to be ignored in the subsequent processing. There are a variety of standard techniques available to identify data that do not meet appropriate quality criteria.

This step does not delete any data. The .SONAR file obtained by step 256 is augmented with a mask that indicates which sample values are to be included and is rewritten (step 260) as a file to the hard disk.

(3) The description of sediment types requires that the surface of the seabed be broken down conceptually and for purposes of measurement into a quilt of rectangular patches each of which will finally be assigned a sediment classification. This step 264 draws on data from the .NAV file, known echo sounder properties and suitable parameters indicating the desired rectangle size, to determine rectangular patches in which groups of .SONAR records appear. These data are stored (step 268) as a file on the hard drive in .RECT format.

The choice of the size of the rectangular patches is a parameter determined to satisfy objective criteria determined at each survey site. In the preferred embodiment, the following criteria have been found to be suitable:
  (a) The rectangular patches should be small enough to provide a spatial resolution sufficient for the purposes of the survey;
  (b) The rectangular patches should not be in numbers so great that they make the subsequent processing of the data unreasonably time-consuming;
  (c) The shape of each rectangular patch should be approximately square as measured on the seabed. As the recorded resolution transverse to the motion of the vessel is usually considerably finer than that along the track of the vessel, the rectangular patches are suitably chosen to include many more points transverse to the vessel's motion than along the track of the vessel.
  (d) The rectangular patches should be large enough to include a sufficient number of points to provide a statistically significant sample.

In the preferred embodiment, a suitable size for a rectangular patch is 16 pings along the track of the vessel by 128 points transverse to the motion of the vessel, containing data for 2048 points in total.

(4) To compensate for the effects of range and angle of incidence on the recorded amplitude values, a first pass through the survey dataset is used to construct a set of summary data that are stored in a compensation table. In a subsequent pass through the survey dataset (step (5) below) the recorded echo amplitudes are adjusted based on the summary data stored in the compensation table.

The construction of the compensation table 262 takes place in three substeps as follows:
  (a) Knowing the depression angle ($\theta$ in FIG. 1) and the range (calculated from the time elapsed between the transmission of the ping and the return of its echo and the speed of sound in sea water) at each survey point detected, the depth from the surface to that point can be calculated by trigonometry.
  (b) By observing how the depth changes across the survey area, it is possible, with one of several well-known techniques, to calculate the normal vectors at survey points. A review of suitable methods for this calculation is presented in "A comparison of local surface geometry estimation methods" [Alan M. McIvor and Robert J. Valkenburg, Machine Vision and Applications (1997) 10: 17–26]. Then, knowing in three dimensions both the depression angle for each survey point (the angle $\theta$ in FIG. 1) and the direction of the normal vector at the point of incidence 126, it is straightforward to calculate the angle of incidence (the angle $\phi$ in FIG. 1) as the angle between the two.
  (c) If the survey records data for n pings and the detector provides data at m survey points for each ping, then the entire survey dataset holds m×n echo amplitudes, Ampl. The echo amplitude corresponding to the j'th survey point (j between 1 and m) within the i'th ping (i between 1 and n) is referred to as $Ampl_{ij}$; the range to that survey point is $Range_{ij}$; and the angle of incidence $\phi$ at that survey point is $Angle_{ij}$.

The compensation table is built as follows:
  (i) the maximum value of the $Range_{ij}$ values is found, MaxRange;
  (ii) a selection is made of a size parameter SR for the range so that the values for range can be partitioned into NR equal partitions each of size SR such that (NR×SR) is at least MaxRange.

A preferred selection for SR is made so that when the range values $Range_{ij}$ are classified into the NR partitions, each partition holds a sufficient number of values so that features calculated subsequently from the populations contained in those partitions are statistically significant.

In practice, a choice of SR of between 75 cm (1 ms, in shallow water) to 7.5 metres (10 ms, in deep water) is generally found to be suitable.
  (iii) a selection is made of a size parameter SA for the angle of incidence $\phi$ (measured in degrees) so that the values for the angle of incidence $Angle_{ij}$ can be partitioned into NA equal partitions each of size SA such that (NA×SA) is at least 90 degrees.

A preferred selection for SA is made so that when the angle of incidence values $Angle_{ij}$ are classified into the NA partitions, each partition holds a sufficient number of values so that features calculated subsequently from the populations contained in those partitions are statistically significant. In practice, a choice of SA in the range about 0.5 degrees to about 1.5 degrees is generally found to be suitable.

(iv) A compensation table Comp is constructed with (NR×NA) cells arranged conceptually as NR rows and NA columns. The cell in row u and column v, $Comp_{uv}$, corresponds to the uth partition of range values and the vth partition of angle of incidence values. Each cell entry holds summary data as three numeric values: $N_{uv}$ is a count of the number of echo amplitudes associated with the $Comp_{uv}$ cell; $S_{uv}$ holds the corresponding sum of the echo amplitudes; and $SSQ_{uv}$ holds the corresponding sum of squares of the echo amplitudes.

The cells in the compensation table are filled by reviewing the entire survey dataset. Any data which has been marked as bad in the quality control step are ignored. For the j'th survey point within the i'th ping, the values of $Range_{ij}$ and $Angle_{ij}$ are examined and the corresponding partitions of range and angle of incidence in which the $Range_{ij}$ and $Angle_{ij}$ values fall (as specified by the indices u and v respectively) are identified. The three numeric values associated with the $Comp_{uv}$ cell are incremented as follows:

$N_{uv} = N_{uv} + 1$ $S_{uv} = S_{uv} + Ampl_{ij}$ $SSQ_{uv} = SSQ_{uv} + (Ampl_{ij} \times Ampl_{ij})$ (These three statements use a common convention to describe the updating of items by an assignment statement. For example, the statement $N_{uv} = N_{uv} + 1$ should be read as "take the present value stored for $N_{uv}$, add 1 to it, and store the result again for $N_{uv}$".)

The results of building the compensation table are stored (step 266) in a file on the hard disk in a .CTABLE format.

(5) The echo amplitudes are adjusted (step 270) using the summary data stored in the compensation table as follows:

(a) The mean amplitude and mean square amplitude are calculated for each cell in the compensation table:

$M_{uv} = S_{uv}/N_{uv}$ the mean amplitude $MSQ_{uv} = SSQ_{uv}/N_{uv}$ the mean square amplitude (b) The echo amplitudes are adjusted in a second pass through the entire survey dataset. As was described above for the construction of the compensation table, the values of $Range_{ij}$ and $Angle_{ij}$ for the j'th point within the i'th ping are examined and the corresponding cell (u, v) is identified. Each echo amplitude, $Ampl_{ij}$, is adjusted as follows:

$Ampl_{ij} = (Ampl_{ij} - M_{uv})/sqrt(MSQ_{uv} - (M_{uv} \times M_{uv}))$

This transformation maps those echo amplitudes associated with each compensation table cell into a population with zero mean and unit variance. The values for mean and variance are chosen for convenience in the preferred embodiment, but the technique can equally well be applied to the data to produce populations each having the same value for the mean and variance, but for which the mean is not zero and the variance is not unity.

The compensated echo amplitudes thus produced are an enhanced image of the survey area, free of artifacts introduced either by inadequate adjustment for range (TVG) or variation due to angle of incidence. After compensation, the amplitudes are usually linearly mapped to [0:255] so they can be displayed as 8-bit images and for convenience in feature generation. It is usually effective to map from [−k:k] to [0:255], where k is a number of standard deviations. Choosing k=4 is suitable for many data sets, while other choices are also effective, including non-symmetrical selections. The resulting data are suitable at this point for a number of uses, one of which, sediment classification, is described in more detail below.

(6) The compensated echo amplitudes are used to calculate a feature vector 271 for each rectangular patch of the survey area. Each feature vector comprises 100 or more features. Each feature is calculated from those echo amplitudes associated with a particular rectangular patch after compensation. These feature vectors are stored on the hard disk in a file with an .FFV format 276 and are used subsequently in a principal components analysis and cluster analysis described in more detail below.

The features selected for this analysis are well-known in the art and are discussed in the following publications:

"Textual Features for Image Classification", R. M. Haralick, K. Shanmugam and I. Dinstein, IEEE Transactions on Systems, Man and Cybernetics, Volume SMC-3, (1973) pp 610–621.

"Seabed classification from sonar data: report for 1993." Milvang, O., K. W. Bjerde, R. B. Huseby and A. S. Solberg, 1994 Norsk Regnesentral/Norwegian Computing Centre, Oslo, Norway.

"Pattern Recognition for SAR Thematic Mapping: Co-occurrence Matrices" Huber R., 1999 http://www.cosy.sbg.ac.at/~reini/diss/node90.html "The use of image processing techniques for the automated detection of blue-green algae" Thiel S. U. 1994 http://www.cs.cf.ac.uk/user/S.U. Thiel/thesis/thesis.html Pace, N. G. and Gao, H., "Swathe Seabed Classification", IEEE Journal of Oceanic Engineering, Vol 13, 83–90, 1988.

"Estimating the fractal dimension from digitized images" Kraft R, Munich University of technology http://www.edv.agrar.tu-muenchen.de/ane/algorithms/algorithms.html For example, the table below includes the features commonly used for the principal component analysis. (The value $x_{pq}$ used below refers to the echo amplitude appearing in column q of row p within a selected rectangular patch. Each rectangular patch is assumed to have P rows and Q columns.)

Mean $$\mu = \frac{1}{PQ} \sum_{p=1}^{P} \sum_{q=1}^{Q} x_{pq}$$

Standard Deviation $$\sigma = \sqrt{\frac{1}{PQ} \sum_{p=1}^{P} \sum_{q=1}^{Q} (x_{pq} - \mu)^2}$$

-continued

| | |
|---|---|
| Skewness | $\frac{1}{PQ\sigma^3}\sum_{p=1}^{P}\sum_{q=1}^{Q}(x_{pq}-\mu)^3$ |
| Kurtosis | $\frac{1}{PQ\sigma^4}\sum_{p=1}^{P}\sum_{q=1}^{Q}(x_{pq}-\mu)^4$ |
| Quantiles | The times at which 10%, 20% . . . 90% of the energy of the echo has been received. Normalized to make the largest value 1. |
| Histogram | Fraction of the echo's energy falling in each of 8 equally spaced ranges. |
| Pace features | As described in Pace et al. supra. |
| Haralick features derived from gray-level co-occurrence matrices | Correlation, prominence, homogeneity and other Haralick features with several step sizes and directions. |
| Fractal dimension | Calculated with the conventional triangular prism surface area algorithm. |

(7) A principal components analysis 274 derives from the feature vectors of all patches a matrix of factors. This is square with as many rows and columns as there are features. Each column holds a vector of factors which can be applied as a weighted sum to a feature vector to produce a single number, a "component". When a feature vector is applied as an inner product with the entire matrix of factors, the result is a revised feature vector transformed to a new basis (representing linear combinations of the original features). There are many possible choices for such a matrix of factors. Of particular utility is the choice where the matrix of factors is chosen to optimize the ability of a small number of the components to accurately represent the feature vectors—a principal components analysis.

The principal component analysis 274 is entirely conventional and follows the accepted methodology described in any standard statistical reference (for example: "Multivariate statistical methods: a primer" B. F. Manly, Chapman and Hall, 1994)

(8) The final computational step is a conventional cluster analysis 272.

To reduce the dimensionality of the task of searching for clusters, only the first three of the factors calculated in the principal components analysis are used. These are usually referred to as Q-factors, Q1, Q2 and Q3 and typically explain more than 90% of the variability in the feature vectors. They can be conveniently displayed as a graph in three dimensions.

The cluster analysis determines a relatively small number (usually between 5 and 10) of clusters which are identified by the coordinates of their centroids as measured in the space spanned by Q-vectors {Q1, Q2, Q3}. Each patch, as represented by its Q-vector is assigned by the technique to a cluster using a Bayesian metric. A confidence value can be derived from the record to the closest cluster and to other clusters and by comparison to the cluster covariance in that direction.

Cluster analysis is a well-known technique and more detail of the theoretical basis for the computations described herein may be found in "Numerical Ecology", P. Legendre and L. Legendre, second English edition, Elsevier Science BV, 1998.

Figure 3:
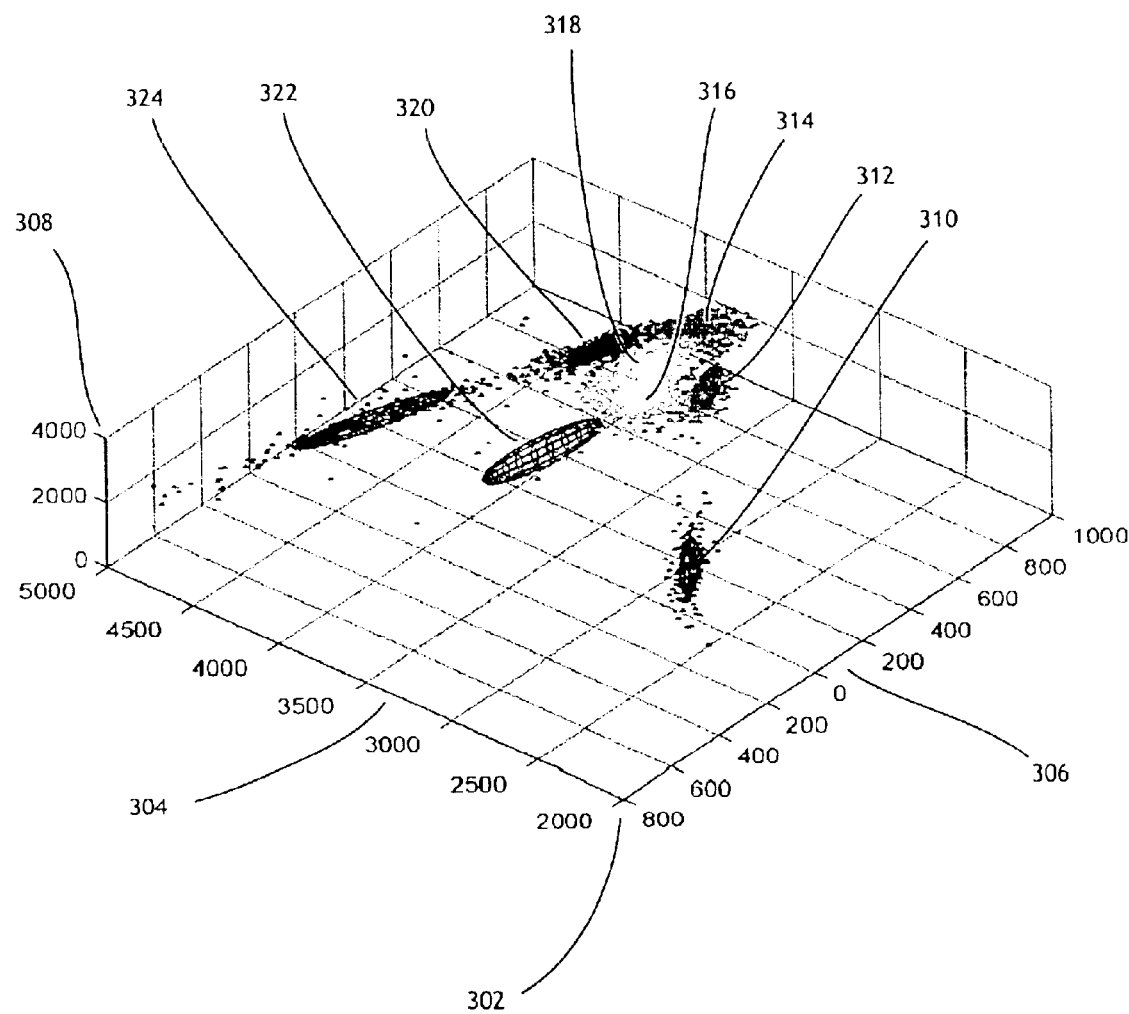
FIG. 3 shows a plot of the results of a typical cluster analysis to classify sediments.

FIG. 3 shows the typical results of the cluster analysis as a set of points arranged in three dimensions 302. The three coordinate axes (304, 306 and 308) of the graph of FIG. 3 correspond to the values of the three most significant components calculated from the principal component analysis step (Q1, Q2 and Q3). The feature vector associated with each rectangular patch produces one point in the graph, calculated by standard means from the principal component weights and the set of features for each rectangular patch. FIG. 3 shows eight cluster of such points, labelled 310 to 324.

Figure 4:
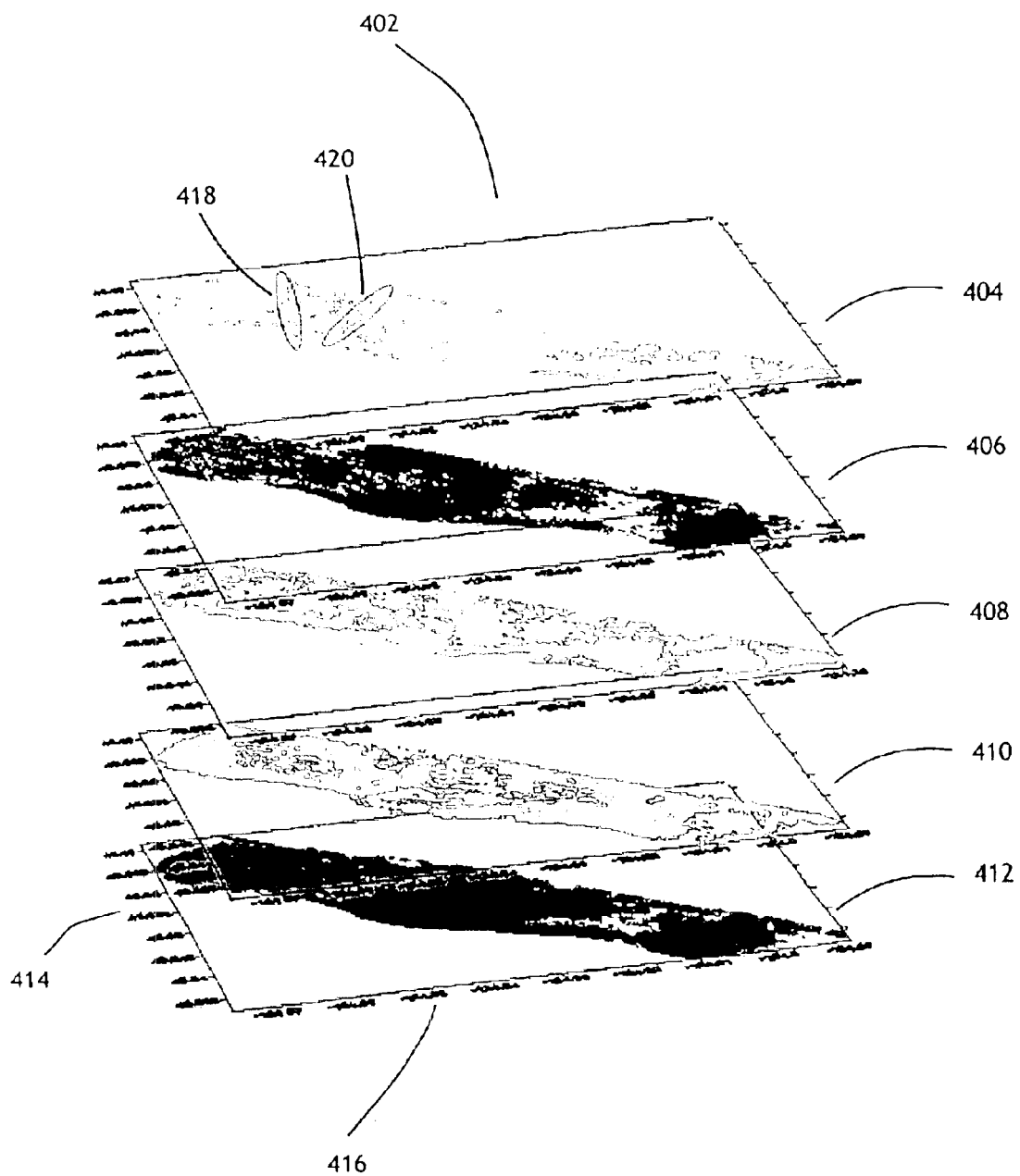
FIG. 4 shows an exploded view of layers, each layer showing the location of one type of sediment plotted against latitude and longitude.

(9) By way of example, FIG. 4 shows a computer screen display 402 of the results of a sediment classification from a multibeam survey. Each cluster identified in the cluster analysis is displayed as a separate layer 404 to 412. Each layer shows the location of points on the seabed, related to axes for latitude 414 and longitude 416, that fall into the same cluster. On a computer screen, the points in each layer have a distinct colour as an aid to viewing (displayed as grey scales in FIG. 5). Of special note, in the uppermost layer 404 (corresponding to cobbles and boulders) are two approximately straight lines highlighted within ellipses 418 and 420. These correspond to the known locations of sewage outfalls along the coast of Parksville, British Columbia, Canada.

Figure 5:
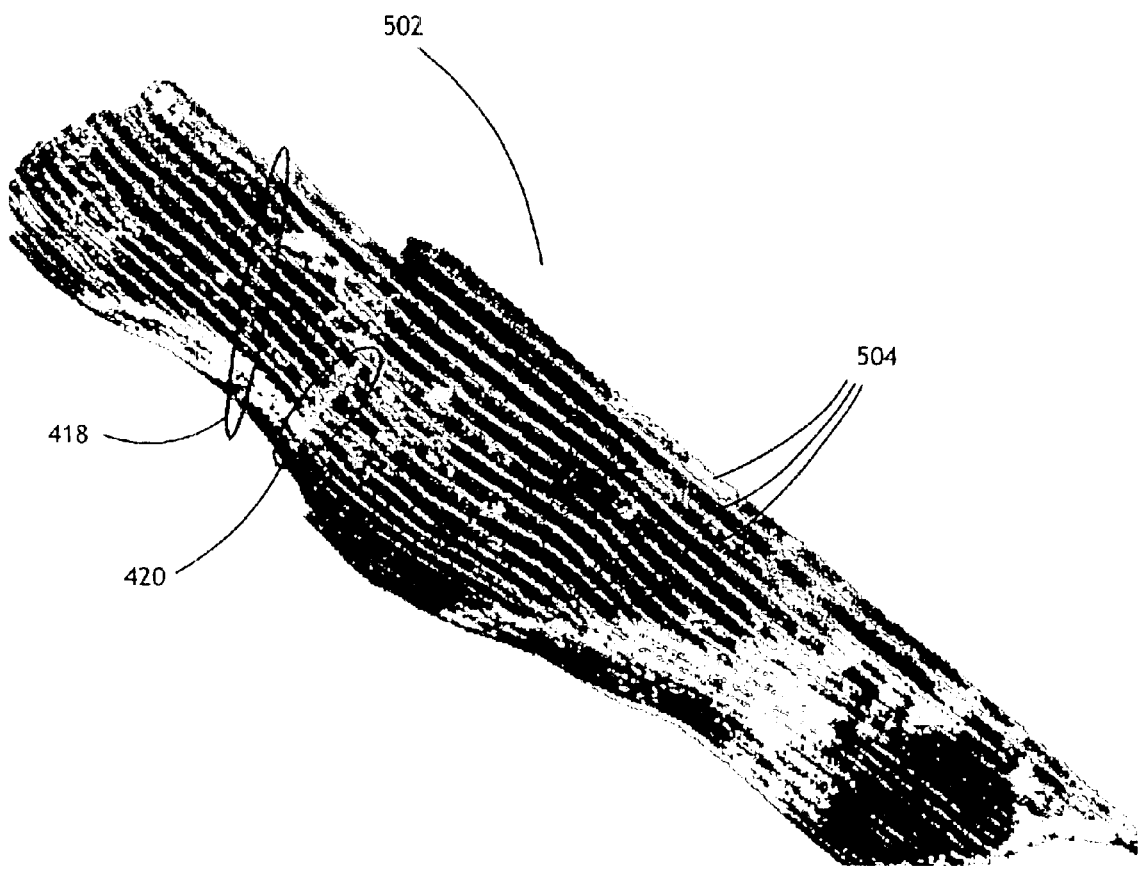
FIG. 5 shows a plot of the layers of FIG. 4 superimposed to provide a visual representation of an exemplary sediment classification.

(10) FIG. 5 shows the five layers 404 to 412 of FIG. 4 superimposed 502. this display clearly shows the tracks of the survey vessel which appear as a band structure 504 throughout the image. The two sewage outfalls are shown as 418 and 420.

The vessel's course is established during the survey by latitude (for example 414) and longitude (for example 416) coordinates obtained from a Global Positioning System.

(11) The data displayed in FIGS. 4 and 5 show portions of the seabed classified according to their acoustic nature. However, in order to make the seabed classification more useful as a description of conditions on the seabed, each cluster is related to the actual conditions on the seabed. This is done by selecting suitable points on the seabed representative of each cluster and returning with a survey vessel to either view actual conditions on the seabed (with a camera) or to bring sediments to the surface (with a "grab").

(12) The final result of the computer program's operation is a compilation of refined data stored in a dataset on a computer-readable medium. The data records are conveniently provided in an ordinary tabular format (".DAT") within an ASCII text file, readily usable by a variety of other off-the-shelf software applications.

Note that while the invention has been described with particular reference to a system and methodology associated with seabed sonar surveying, and that the description has been focused on a multibeam sonar system, those skilled in the technology will recognize that variants and modifications can readily be made to enable the principles of the invention to be applied to other terrain and objects to be surveyed, including adaptation to other types of sonar system.

We claim:

1. A method of enhancing an image of a survey area comprising the steps of:
   (a) transmitting sonar pulses from a reference origin repeatedly towards the survey area;
   (b) measuring the amplitudes of echoes received at the reference origin, said echoes being scattered back from a plurality of survey points in the survey area, each survey point having a known position measured from the reference origin;

(c) calculating the range to each survey point as the distance from the reference origin to each survey point;

(d) calculating the angle of incidence at each survey point as the angle between a line from the reference origin to each said survey point and a vector normal to the survey area at each said survey point;

(e) compensating the amplitude of the echo for each survey point by applying a selected function of the range and angle of incidence to adjust for the attenuation of the echo amplitude due to range and angle of incidence;

thereby to obtain an enhanced image of the survey area.

2. The method of claim 1 wherein step (e) comprises:

(e1) selecting partitions of range values, said partitions collectively including all range values observed at the survey points, and partitions of angle of incidence values, said partitions collectively including all angle of incidence values observed at the survey points;

(e2) creating a compensation table as a two dimensional array of cells, each cell being associated with a unique combination of one partition of rang values and one partition of angle of incidence values;

(e3) calculating, for each compensation table cell, summary data from the echo amplitudes of all survey points having range within the partition of range values associated with said cell and having angle of incidence within the partition of angle of incidence values associated with same said cell;

(e4) calculating compensated echo amplitudes by transforming the amplitude of the echo for each survey point using a selected function of the summary data of the compensation table cell whose associated partition of range values and associated partition of angle of incidence values contain the range and angle of incidence associated with said survey point.

3. The method of claim 2 wherein:

(i) the summary data calculated in substep (e3) for each compensation table cell is a count of the number of survey points associated with each said cell N, the sum of the echo amplitudes thus associated with each said cell S and the sum of the squares of the echo amplitudes thus associated with each said cell SSQ;

(ii) the mean amplitude for each compensation table cell M is calculated as S/N;

(iii) the mean square amplitude for each compensation table cell MSQ is calculated as SSQ/N;

(iv) constants C and D are selected;

(v) the transformation applied in substep (e4) to the echo amplitude A of each survey point is:

$$D \times (A+C-M)/sqrt(MSQ-(M \times M))$$

whereby the compensated echo amplitudes associated with each compensation table cell comprise a population having a mean of C and standard deviation D.

4. The method of claim 3 wherein the constant C is 0 and the constant D is 1.

5. The method of claim 1 wherein the survey area is a selected portion of a seabed.

6. The method of claim 1, further comprising the step of displaying the compensated echo amplitudes at the survey points within the survey area.

7. The method of claim 6 wherein the display is a mosaic, map, graph, or interactive electronic display.

8. A system for enhancing an image of a survey area comprising:

(a) a transmitter for transmitting sonar pulses from a reference origin repeatedly towards the survey area;

(b) a detector for measuring the amplitudes of echoes received at the reference origin, said echoes being scattered back from a plurality of survey points in the survey area, each survey point having a known position measured from the reference origin;

(c) means for calculating the range to each survey point as the distance from the reference origin to each survey point;

(d) means for calculating the angle of incidence at each survey point as the angle between a line from the reference origin to each said survey point and a vector normal to the survey area at each said survey point;

(e) means for compensating the amplitude of the echo for each survey point by applying a selected function of the range and angle of incidence to adjust for the attenuation of the echo amplitude due to range and angle of incidence;

thereby to obtain an enhanced image of the survey area.

9. The system of claim 8 wherein the means for compensating the echo amplitudes:

(e1) selects partitions of range values, said partitions collectively including all range values observed at the survey points, and partitions of angle of incidence values, said partitions collectively including all angle of incidence values observed at the survey points;

(e2) creates a compensation table as a two dimensional array of cells, each cell being associated with a unique combination of one partition of range values and one partition of angle of incidence values;

(e3) calculates, for each compensation table cell, summary data from the echo amplitudes of all survey points having range within the partition of range values associated with said cell and having angle of incidence within the partition of angle of incidence values associated with same said cell;

(e4) calculates compensated echo amplitudes by transforming the amplitude of the echo for each survey point using a selected function of the summary data of the compensation table cell whose associated partition of range values and associated partition of angle of incidence values contain the range and angle of incidence associated with said survey point.

10. The system of claim 9 wherein:

(i) the summary data calculated in substep (e3) for each compensation table cell is a count of the number of survey points associated with each said cell N, the sum of the echo amplitudes thus associated with each said cell S and the sum of the squares of the echo amplitudes thus associated with each said cell SSQ;

(ii) the mean amplitude for each compensation table cell M is calculated as S/N;

(iii) the mean square amplitude for each compensation table cell MSQ is calculated as SSQ/N;

(iv) constants C and D are selected;

(v) the transformation applied in substep (e4) to the echo amplitude A of each survey point is:

$$D \times (A+C-M)/sqrt(MSQ-(M \times M))$$

whereby the compensated echo amplitudes associated with each compensation table cell comprise a population having a mean of C and standard deviation D.

11. The system of claim 10 wherein the constant C is 0 and the constant D is 1.

12. The system of claim 8 wherein the survey area is a selected portion of a seabed.

13. The system of claim 8 further comprising a display for displaying the compensated echo amplitudes at the survey points within the survey area.

14. The system of claim 13 wherein the display is a mosaic, map, graph, or interactive electronic display.

15. A method of classifying a survey area, substantially covered by a plurality of two dimensional patches, according to an attribute determined for each patch, comprising the steps of:
- (a) transmitting sonar pulses from a reference origin repeatedly towards the survey area;
- (b) measuring the amplitudes of echoes received at the reference origin, said echoes being scattered back from a plurality of survey points in the survey area, each survey point being located in a known patch and having a known position measured from the reference origin;
- (c) calculating the range to each survey point as the distance from the reference origin to each survey point;
- (d) calculating the angle of incidence at each survey point as the angle between a line from the reference origin to each said survey point and a vector normal to the survey area at each said survey point;
- (e) compensating the amplitude of the echo for each survey point by applying a selected function of the range and angle of incidence to adjust for the attenuation due to range and angle of incidence;
- (f) calculating, for each patch, a vector of features, each feature being calculated as a selected function of the compensated echo amplitudes of the survey points associated with that patch;
- (g) calculating one or more components, each component being a set of factors defining a linear combination of the features whereby the inner product of any one of the feature vectors of a patch with all the components produces a Q-vector having as many elements as there are components, said Q-vector being representative of the acoustic nature of the patch;
- (h) identifying the centroids of one or more clusters as points in the space of Q-vectors and assigning each patch according to its Q-vector to a cluster; and
- (i) associating each cluster with a distinct value of the attribute by empirical examination of said attribute at representative survey points in the survey area, thereby to obtain a refined classification of the patches according to the attribute.

16. The method of claim 15 wherein step (e) comprises:
- (e1) selecting partitions of range values, said partitions collectively including all range values observed at the survey points, and partitions of angle of incidence values, said partitions collectively including all angle of incidence values observed at the survey points;
- (e2) creating a compensation table as a two dimensional array of cells, each cell being associated with a unique combination of one partition of range values and one partition of angle of incidence values;
- (e3) calculating, for each compensation table cell, summary data from the echo amplitudes of all survey points having range within the partition of range values associated with said cell and having angle of incidence within the partition of angle of incidence values associated with same said cell; and
- (e4) calculating compensated echo amplitudes by transforming the amplitude of the echo for each survey point using a selected function of the summary data of the compensation table cell whose associated partition of range values and associated partition of angle of incidence values contain the range and angle of incidence associated with said survey point.

17. The method of claim 16 wherein:
- (i) the summary data calculated in substep (e3) for each compensation table cell is a count of the number of survey points associated with each said cell N, the sum of the echo amplitudes thus associated with each said cell S and the sum of the squares of the echo amplitudes thus associated with each said cell SSQ;
- (ii) the mean amplitude for each compensation table cell M is calculated as S/N;
- (iii) the mean square amplitude for each compensation table cell MSQ is calculated as SSQ/N;
- (iv) constants C and D are selected;
- (v) the transformation applied in substep (e4) to the echo amplitude A of each survey point is:

$$D \times (A + C - M) / sqrt(MSQ - (M \times M))$$

whereby the compensated echo amplitudes associated with each compensation table cell comprise a population having a mean of C and standard deviation D.

18. The method of claim 17 wherein the constant C is 0 and the constant D is 1.

19. The method of claim 16, 17 or 18 wherein the partitions of range values are selected to be of equal size.

20. The method of claim 16, 17 or 18 wherein the partitions of angle of incidence values are selected to be of equal size.

21. The method of claim 15, 16, 17 or 18 wherein the features selected include mean, standard deviation, skewness, kurtosis, deciles, histogram, Pace features, Haralick features and fractal dimension.

22. The method of claim 15, 16, 17 or 18 wherein the components are calculated in step (g) by a principal components analysis.

23. The method of claim 15, 16, 17 or 18 wherein the assignment of patches to clusters is calculated in step (h) by a cluster analysis.

24. The method of claim 15, 16, 17 or 18 wherein each patch is rectangular.

25. The method of claim 15 wherein the survey area is a selected portion of a seabed, and the attribute associated with the clusters is a distinguishable type of sediment present on said seabed.

26. The method of claim 15 further comprising the step of displaying the patches of the survey area, each patch showing the attribute associated with the cluster to which each said patch has been assigned.

27. The method of claim 26 wherein the display is a mosaic, map, graph, or interactive electronic display.

28. A system for classifying a survey area, substantially covered by a plurality of two dimensional patches, according to an attribute determined for each patch, comprising:
- (a) a transmitter for transmitting sonar pulses from a reference origin repeatedly towards the survey area;
- (b) a detector for measuring the amplitudes of echoes received at the reference origin, said echoes being scattered back from a plurality of survey points in the survey area, each survey point being located in a known patch and having a known position measured from the reference origin;
- (c) means for calculating the range to each survey point as the distance from the reference origin to each survey point;

(d) means for calculating the angle of incidence at each survey point as the angle between a fine from the reference origin to each said survey point and a vector normal to the survey area at each said survey point;

(e) means for compensating the amplitude of the echo for each survey point by applying a selected function of the range and angle of incidence to adjust for the attenuation due to range and angle of incidence;

(f) means for calculating, for each patch, a vector of features, each feature being calculated as a selected function of the compensated echo amplitudes of the survey points associated with that patch;

(g) means for calculating one or more components, each component being a set of factors defining a linear combination of the features whereby the inner product of any one of the feature vectors of a patch with all the components produces a Q-vector having as many elements as there are components, said Q-vector being representative of the acoustic nature of the patch;

(h) means for identifying the centroids of one or more clusters as points in the space of Q-vectors and assigning each patch according to its Q-vector to a cluster; and (i) means for associating each duster with a distinct value of the attribute by empirical examination of said attribute at representative survey points in the survey area, thereby to obtain a refined classification of the patches according to the attribute.

29. The system of claim 28 wherein the means for compensating the echo amplitudes:

(e1) selects partitions of range values, said partitions collectively including all range values observed at the survey points, and partitions of angle of incidence values, said partitions collectively including all angle of incidence values observed at the survey points;

(e2) creates a compensation table as a two dimensional array of cells, each cell being associated with a unique combination of one partition of range values and one partition of angle of incidence values;

(e3) calculates, for each compensation table cell, summary data from the echo amplitudes of all survey points having range within the partition of range values associated with said cell and having angle of incidence within the partition of angle of incidence values associated with same said cell; and (e4) calculates compensated echo amplitudes by transforming the amplitude of the echo for each survey point using a selected function of the summary data of the compensation table cell whose associated partition of range values and associated partition of angle of incidence values contain the range and angle of incidence associated with said survey point.

30. The system of claim 29 wherein:

(i) the summary data calculated in substep (e3) for each compensation table cell is a count of the number of survey points associated with each said cell N, the sum of the echo amplitudes thus associated with each said cell S and the sum of the squares of the echo amplitudes thus associated with each said cell SSQ;

(ii) the mean amplitude for each compensation table cell M is calculated as S/N;

(iii) the mean square amplitude for each compensation table cell MSQ is calculated as SSQ/N;

(iv) constants C and D are selected;

(v) the transformation applied in substep (e4) to the echo amplitude A of each survey point is:

$$D \times (A+C-M)/sqrt(MSQ-(M \times M))$$

whereby the compensated echo amplitudes associated with each compensation table cell comprise a population having a mean of C and standard deviation D.

31. The system of claim 30 wherein the constant C is 0 and the constant D is 1.

32. The system of claim 29, 30 or 31 wherein the partitions of range values are selected to be of equal size.

33. The system of claim 29, 30 or 31 wherein the partitions of angle of incidence values are selected to be of equal size.

34. The system of claim 28, 29, 30 or 31 wherein the features selected include mean, standard deviation, skewness, kurtosis, deciles, histogram, Pace features, Haralick features and fractal dimension.

35. The system of claim 28, 29, 30 or 31 wherein the components are calculated in step (g) by a principal components analysis.

36. The system of claim 28, 29, 30 or 31 wherein the assignment of patches to clusters is calculated in step (h) by a cluster analysis.

37. The system of claim 28, 29, 30 or 31 wherein each patch is rectangular.

38. The system of claim 28 wherein the survey area is a selected portion of a seabed, and the attribute associated with the clusters is a distinguishable type of sediment present on said seabed.

39. The system of claim 28 further comprising a display for displaying the patches of the survey area, each patch showing the attribute associated with the cluster to which each said patch has been assigned.

40. The system of claim 39 wherein the display is a mosaic, map, graph, or interactive electronic display.

* * * * *